Figure 1:
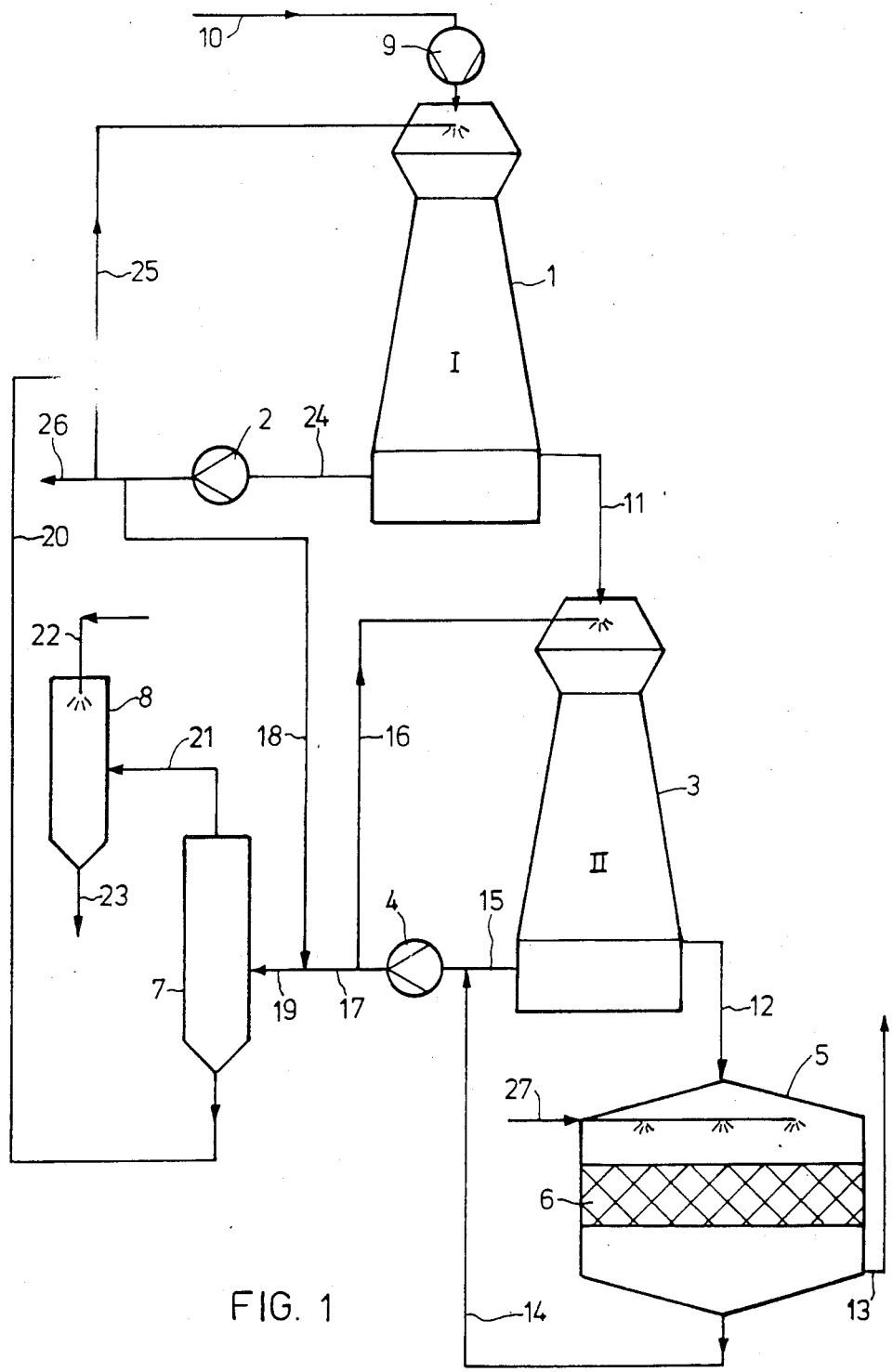

United States Patent [19]

Lailach et al.

[11] Patent Number: 4,670,235
[45] Date of Patent: Jun. 2, 1987

[54] PROCESS FOR DESULPHURIZING FLUE GASES

[75] Inventors: Günter Lailach; Rudolf Gerken; Karl-Heinz Schultz, all of Krefeld, Fed. Rep. of Germany

[73] Assignee: Bayer Aktiengesellschaft, Leverkusen, Fed. Rep. of Germany

[21] Appl. No.: 775,201

[22] Filed: Sep. 12, 1985

[30] Foreign Application Priority Data

Sep. 29, 1984 [DE] Fed. Rep. of Germany ....... 3435931

[51] Int. Cl.⁴ .................. B01D 53/14; C01B 17/775; C01B 17/90
[52] U.S. Cl. .................. 423/240; 423/522; 423/531
[58] Field of Search .......... 55/71; 423/240 R, 242 R, 423/522, 531, 488

[56] References Cited

U.S. PATENT DOCUMENTS

| 940,595 | 11/1909 | Herreshoff | 423/240 R |
| 1,764,593 | 6/1930 | Adamson | 423/488 |
| 3,862,295 | 1/1975 | Tolles | 423/522 |
| 3,907,970 | 9/1975 | Boening | 423/242 R |
| 4,495,162 | 1/1985 | Jons et al. | 423/171 |

FOREIGN PATENT DOCUMENTS 2738501 3/1979 Fed. Rep. of Germany .
59-783 6/1974 Japan ........................ 55/71

Primary Examiner—John Doll
Assistant Examiner—Jeffrey Edwin Russel
Attorney, Agent, or Firm—Sprung Horn Kramer & Woods

[57] ABSTRACT

In the desulphurizing of $SO_2-$ and hydrogen halide-containing flue gases by catalytically oxidizing the sulphur dioxide on moist active carbon at a temperature of from 45° to 70° C. with the formation of 3 to 20% dilute sulphuric acid, the improvement which comprises contacting the dilute sulphuric acid with the hot flue gases to be desulphurized so as to evaporate water resulting sulphuric acid of a concentration of from 60 to 85%, and removing by evaporation the hydrogen chloride and hydrogen fluoride dissolved in the dilute sulphuric acid. Advantageously evaporation is carried out in two scrubbing stages, the hydrogen chloride and hydrogen fluoride being removed, by vacuum evaporation or by stripping with air or flue gas, from a mixture of the dilute sulphuric acid from the second scrubbing stage with the concentrated sulphuric acid from the first scrubbing stage, the mixture having the $H_2SO_4$ concentration of from 40 to 70%.

5 Claims, 1 Drawing Figure

PROCESS FOR DESULPHURIZING FLUE GASES

This invention relates to a process for desulphurizing $SO_2-$ and hydrogen halide-containing flue gases by catalytically oxidizing the sulphur dioxide on moist active carbon at a temperature of from 45° to 70° C. with the formation of 3 to 20% dilute sulphuric acid.

The desulphurization of flue gases, particularly the large quantities of flue gas produced by the flow of coal and heavy fuel oil in power stations, is an imperative requirement. Processes known hitherto necessitate substantial expenditure on apparatus. The majority of processes are based on reacting Ca-compounds, particularly ground limestone, to produce gypsum. The minimal value of this end product, which, owing to its substantial water content, entails substantial expenditure for storage, dehydration and transportation to dumps or users, does not noticeably reduce the total expenditure (German Offenlegungsschrifts Nos. 2,430,909, 2,811,646).

It is also known to desulphurize process gases by oxidizing the sulphur dioxide in the presence of water to produce sulphuric acid on particular active carbon catalysts. The process which is known as the "sulphacid process" generally produces 5 to 20% sulphuric acid. The lack of possible uses for such dilute sulphuric acid and the requirement that the $SO_2$—containing gas which is introduced into the fixed bed reactor should contain less than 20 mg of dust/$m^3$, mean that this process has not hitherto been considered as a possible alternative for the above flue gas desulphurization processes.

However, there are no known processes for desulphurizing flue gases containing a relatively high quantity of HCl and HF.

An object of this invention is to provide an economic operationally-reliable process using straight-forward apparatus for desulphurizing flue gases, which does not suffer from the disadvantages of known processes.

This object is achieved by a process in which the $SO_2$-containing flue gas emitted from the power station is subjected, prior to oxidation on contact with active carbon, to a first scrubbing (I) with 50 to 85% sulphuric acid and to a second scrubbing (I) with 5 to 25% sulphuric acid.

Thus, this invention provides a process for desulphurizing $SO_2$— and hydrogen halide-containing flue gases by catalytically oxidizing sulphur dioxide on moist active carbon at a temperature of from 45° to 70° C. with the formation of 3 to 20% dilute sulphuric acid, which process is characterized in that the dilute sulphuric acid is evaporated, on contact with hot flue gases to be desulphurized, to a sulphuric acid concentration of from 60 to 85%, and hydrogen chloride and hydrogen fluoride dissolved in the dilute sulphuric acid are removed by evaporation.

The embodiment of the process according to the invention, in which the flue gases to be desulphurized have a temperature of at least 120° C., is particularly advantageous.

As the sulphur concentration rises to from 60 to 85%, there is a simultaneous cooling of the flue gases to from 90° to 110° C.

A second scrubbing (II) with 5 to 25% sulphuric acid is subsequently carried out, HCl and HF thereby being absorbed into the acid. This thereby prevents negative influences on the catalytic reaction of the $SO_2$ on the active carbon. The flue gas, which is at a temperature of from 45° to 70° C. and is substantially free from dust, is passed through a layer of active carbon which is continuously or discontinuously sprayed with a sufficient quantity of water that a 3 to 20% sulphuric acid flows off. The flow of gas can be passed alternatively from below upwards or vice-versa through the layer of carbon.

Thus, this invention relates to a process in which evaporation is effected in two stages in co-current or counter-current scrubbers.

On flowing through the layer of active carbon, the flue gas is saturated with steam and cooled to a temperature of from 45° to 55° C. This cooling can be prevented if steam, which is, for example, produced as exhaust steam in various processes, is introduced into the flue gas before it enters the layer of active carbon, preferably after scrubbing (I).

The 3 to 20% sulphuric acid produced in the active carbon reactor during desulphurization is virtually worthless. This acid is fed according to the invention via the sulphuric acid circuit of scrubbing (II) into the sulphuric acid circuit of scrubbing (I), by conveying a sufficient quantity of water to the flue gas by cooling by evaporation, 60 to 85% sulphuric acid is discharged. This acid can either be used directly, such as in the fertilizer industry, or can be evaporated at relatively minimum expense by known processes to an $H_2SO_4$ content of from 80 to 93%.

Owing to the poor solubility of HCl and HF in the 50 to 85% sulphuric acid at a temperature of from 90° to 110° C., these compounds contained in small quantities in the flue gas would continually concentrate in the flue gas being supplied to the active carbon and contaminate the active carbon catalyst if the flue gas is passed from scrubbing (I) directly into the active carbon reactor and the HCl— and HF-containing acid from the reactor is passed directly to the scrubbing (I). This is prevented by the second scrubbing (II) of the flue gases with 5 to 25% sulphuric acid at a temperature of from 50° to 70° C. The advantage of this is that HCl and HF are substantially removed from the flue gas by absorption into the 5 to 25% sulphuric acid, before the flue gas is passed into the active carbon reactor, and that the heat content of gas released, as the flue gas is cooled from 90° to 110° C. to 45° to 70° C., is used for evaporating the acid.

The HCl and HF is expelled from the scrubbing acid of the scrubbing circuit (II) by mixing the HCl- and HF-containing 5 to 25% sulphuric acid emitted from the scrubbing (II) with a sufficient quantity of 60 to 85% sulphuric acid from the scrubbing (I) to produce a 40 to 70% sulphuric acid. HCl, HF and some of the water is evaporated from this sulphuric acid by stripping with air or flue gas or by evacuating. The vapors can be condensed by indirect or direct cooling.

In a preferred embodiment of the process according to the invention, hydrogen chloride and hydrogen fluoride are removed by vacuum evaporation from a mixture of dilute sulphuric acid from the second stage of scrubbing with the concentrated sulphuric acid from the first stage of scrubbing, the mixture having an $H_2SO_4$ concentration of from 40 to 70%.

However, the embodiment in which hydrogen chloride and hydrogen fluoride are removed from a mixture of the dilute sulphuric acid from the second stage of scrubbing with the concentrated sulphuric acid from the first stage of scrubbing, the mixture having an $H_2SO_4$ concentration of from 40 to 70%, by stripping with air or flue gas and the hydrogen halides are subsequently scrubbed out of the gas with water, can be equally advantageous.

The vapors can advantageously be condensed by direct cooling and washing with cooling water.

The process according to the invention is illustrated by the drawing which is a schematic flow sheet. The drawing shows a flue gas desulphurization apparatus for desulphurizing the entire flow with a pure gas-$SO_2$ content of less than 400 mg/$m^3{}_n$, consisting of a gas scrubber (I), in which the flue gas is simultaneously cooled and moistened, fine dust is removed and the sulphuric acid is concentrated, a gas scrubber (II), in which the gas is further cooled while the sulphuric acid is simultaneously concentrated and the fine dust is removed, as is the HCl and HF from the flue gas, an active carbon reactor (5) for catalytically reacting the sulphur dioxide with oxygen and water to produce sulphuric acid and an additional apparatus (7, 8) for removing HCl and HF from the sulphuric acid. The flue gas (10) is passed through the scrubber (1) by means of the blaster (9), in which scrubber (1) it is cooled to a temperature of from 90° to 110° C. on contact with 50 to 85% sulphuric acid.

The gas (11) issuing from the scrubber (1) contacts, in the scrubber (3), 5 to 25% sulphuric acid. The gases are thereby cooled to from 50° to 70° C. and most of the HCl and HF is absorbed into the sulphuric acid. The flue gas (12) which is almost saturated with steam and substantially dust-free is passed, in the reactor (5), through a moist layer of active carbon (6) in which sulphuric acid is formed from sulphur dioxide, oxygen and water.

The pure gas (13) issuing from the reactor (5) is passed directly into the atmosphere, or after heating with hot flue gases or a partial flow of the crude gas, or after indirect heating in heat exchangers.

The sulphuric acid formed in the active carbon layer (6) of the reactor (5) is removed as a 3 to 20% sulphuric acid (14) by continuously or discontinuously spraying the layer of carbon (6) with water (27) and fed into the acid circuit (15) of scrubbing (II). 5 to 25% sulphuric acid (15) is drawn off by pump (4) from the sump of the scrubber (3) in scrubbing (II) and is substantially (16) conveyed to the top of the scrubber. A partial flow (17), corresponding to the flow (14) minus the quantity of water which has been evaporated in the scrubber (3), is fed into a vacuum evaporator, together with 60 to 75% sulphuric acid (18), as a 40 to 65% sulphuric acid (19). HCl, HF and a small quantity of water evaporate herein. The vapors (21) are condensed in an injection condenser (8) with cooling water (22) and are drawn off as slightly acidic waste water (23). The HCl— and HF-free sulphuric acid (20) is fed into the acid circuit of scrubbing (I). The crude gas is washed with 50 to 75% sulphuric acid (25) in this scrubbing. After some of the water has evaporated from the acid, the 60 to 75% sulphuric acid (24) is drawn off from the sump of the scrubber (1) by means of the circulation pump (2). The 60 to 75% sulphuric acid (26) obtained as the product can be cooled from 90° to 110° C. by indirect cooling or can be passed on for further evaporation.

As an alternative, the gas scrubbing and acid evaporation can take place not in the jet scrubbers shown, but also in washing columns, Venturi scrubbers or similarly-suited apparatus, with the flue gas in co-current or in counter-current to the sulphuric acid which is fed in. The HCl and HF can also be removed by stripping the acid (19) with air or flue gas, instead of in the vacuum evaporator (7).

The HCl— and HF-charged air or the flue gas has therefore to be subsequently purified with water in a gas scrubber. As soon as there is a possible use for the acids from the exhaust vapors (21), the latter are indirectly cooled.

The process according to the invention is explained in more detail in the following example without limiting the scope of the present invention.

EXAMPLE

This example relates to flue gas desulphurization according to the drawing. 210,000 $m^3{}_n$/h of flue gas (10) containing 7.15% by volume of $H_2O$, 6% by volume of $O_2$, 3.3 g of $SO_2$/$m^3{}_n$, 0.2 g of HCl/$m^3{}_n$ and 30 mg of dust/$m^3{}_n$ are fed at a temperature of 130° C. into the scrubber (1). 3.06 t of $H_2O$/h are evaporated from this acid on contact with 69% sulphuric acid (25). The flue gas (11) passes at a temperature of 100° C. from the scrubber (1) into the scrubber (3), where it is scrubbed with 18.9% sulphuric acid (16). The flue gas (12) issuing at a temperature of 53° C. from the scrubber (3) contains 11.75% by volume of $H_2O$, 3.3 g of $SO_2$/$m^3{}_n$, less than 10 mg of dust/$m^3{}_n$ and traces of HCl. As it flows through the active carbon fixed bed (6) in the reactor (5), the $SO_2$ content of the flue gas is reduced by catalytic oxidation to sulphuric acid from 3.3 g/$m^3{}_n$ to from 350 to 400 mg/$m^3{}_n$ in the pure gas (13).

The sulphuric acid which is formed is washed out as an 8.4% sulphuric acid (14) in the reactor (5) by periodically spraying the layer of carbon with 9.75 $m^3$/h of water (27). This sulphuric acid is fed to the acid circuit of the scrubber (3). 5.75 t of $H_2O$/h are evaporated from the sulphuric acid in the scrubber (3). 4.63 t/h of the 18.9% acid circuit (17), which also contains 0.84% of HCl, are mixed with 7.15 t/h of 70% sulphuric acid (18) from scrubber (1) and fed in at 80° C. (19) to the vacuum evaporator (7) as 50% sulphuric acid. 39 kg of HCl/h and 283 kg of $H_2O$/h (21) evaporate under 50 mbars with cooling the acid to 55° C., the vapors are condensed in the condenser (8) by direct contact with 18 $m^3$/h of cooling water (22). The uncondensable gases are drawn by suction from the condenser (8) by a vacuum pump.

The HCl-free 51% sulphuric acid (20) from the vacuum evaporator (7) is fed into the acid circuit of scrubbing (I). 1.24 t/h of 70% sulphuric acid (26) are obtained as the product at a temperature of 100° C. from scrubbing (I).

It will be understood that the specification and examples are illustrative but not limitative of the present invention and that other embodiments within the spirit and scope of the invention will suggest themselves to those skilled in the art.

We claim:

1. A process for purifying a hot flue gas containing sulphur dioxide and hydrogen halide, which comprises:
    (a) contacting the hot flue gas with sulphuric acid of 50 to 85% concentration thereby to produce more concentrated sulphuric acid and a cooled flue gas still containing sulphur dioxide and hydrogen halide,
    (b) contacting the cooled flue gas of (a) with sulphuric acid of 5 to 25% concentration thereby to absorb the hydrogen halide and leave a hydrogen halide-free sulphur dioxide contained in the flue gas, (c) oxidizing the sulphur dioxide-containing flue gas of (b) and absorbing it to produce sulphuric acid of 3 to 20% concentration, and (d) mixing the hydrogen halide-containing sulphuric acid from (b) with sulphuric acid from (a) to expel the hydrogen halide and leave sulphuric acid of 40 to 70% concentration.

2. A process according to claim 1, wherein the oxidation of (c) is effected over moist active carbon as a catalyst.

3. A process according to claim 1, wherein the hydrogen halide expelled in (d) is absorbed in water to form an aqueous solution thereof.

4. A process according to claim 1, wherein the sulphuric acid product of (d) is used at least in part in (a).

5. A process according to claim 1, wherein the sulphuric acid product of (c) is used at least in part in (b).

* * * * *